US011103825B2

United States Patent
Fekety et al.

(10) Patent No.: US 11,103,825 B2
(45) Date of Patent: Aug. 31, 2021

(54) METHODS OF SOOT CAPTURE AND ARTICLES FORMED THEREFROM

(71) Applicant: CORNING INCORPORATED, Corning, NY (US)

(72) Inventors: Curtis Robert Fekety, Corning, NY (US); Thomas Richard Chapman, Painted Post, NY (US); Douglas Hull Jennings, Corning, NY (US); Nicolas LeBlond, Painted Post, NY (US); He Jing, Corning, NY (US); Christopher Scott Thomas, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 188 days.

(21) Appl. No.: 16/524,507

(22) Filed: Jul. 29, 2019

(65) Prior Publication Data
US 2020/0038796 A1    Feb. 6, 2020

Related U.S. Application Data

(60) Provisional application No. 62/713,821, filed on Aug. 2, 2018.

(51) Int. Cl.
*B01D 47/06* (2006.01)
*F23D 14/00* (2006.01)
*B01D 47/05* (2006.01)

(52) U.S. Cl.
CPC .............. *B01D 47/05* (2013.01); *B01D 47/06* (2013.01); *F23D 14/00* (2013.01); *B01D 2252/103* (2013.01); *B01D 2258/0283* (2013.01)

(58) Field of Classification Search
CPC .......... F23D 14/00; F23D 14/02; F23D 14/32; C03B 19/14
See application file for complete search history.

(56) References Cited

U.S. PATENT DOCUMENTS

| 4,775,401 A | 10/1988 | Fleming et al. |
| 5,123,836 A | 6/1992 | Yoneda et al. |
| 5,240,488 A | 8/1993 | Chandross et al. |
| 6,432,149 B1 * | 8/2002 | Miller ...................... B01J 10/00 202/219 |
| 6,606,883 B2 * | 8/2003 | Hrdina ................ C03B 19/1407 65/17.4 |
| 6,796,143 B2 | 9/2004 | Clasen et al. |
| 6,849,114 B2 | 2/2005 | Oswald et al. |

FOREIGN PATENT DOCUMENTS

| GB | 849140 A | 9/1960 |
| JP | 54131039 A | 10/1979 |

OTHER PUBLICATIONS

International Search Report and Written Opinion of the International Searching Authority; PCT/US2019/043654; dated Oct. 2, 2019; 14 Pgs.

* cited by examiner

*Primary Examiner* — Robert A Hopkins
(74) *Attorney, Agent, or Firm* — Kevin L. Bray

(57) ABSTRACT

A method of capturing soot includes the steps: combusting a first precursor in a burner to produce a soot stream, the soot stream comprising soot and exiting the burner at an outlet; and directing a capture medium to the soot stream, the capture medium contacting the soot in an impact region, the soot having a temperature greater than 50° C. in the impact region.

19 Claims, 6 Drawing Sheets

METHODS OF SOOT CAPTURE AND ARTICLES FORMED THEREFROM

This application claims the benefit of priority to U.S. Provisional Application Ser. No. 62/713,821 filed on Aug. 2, 2018, the content of which is relied upon and incorporated herein by reference in its entirety.

FIELD OF THE DISCLOSURE

The present disclosure generally relates to methods of soot capture, and more specifically to methods of soot capture and articles formed from the captured soot.

BACKGROUND

Optical articles may be manufactured by pyrogenically producing and depositing ultra-high purity, nanoscale glass particles (soot) on a target. However, soot deposition efficiency is often less than desirable with a portion of the soot being captured in a pollution abatement system. "Scrubber" type pollution abatement systems have been used to capture small particles from various gas exhausts for pollution abatement purposes, but the resultant collection of particles is often contaminated and has few uses. Further, the soot produced may have changes in concentration or composition resulting in variation in articles produced from the soot.

SUMMARY OF THE DISCLOSURE

According to at least one feature of the present disclosure, a method of capturing soot, includes the steps of: combusting a first precursor in a burner to produce a soot stream, the soot stream comprising soot and exiting the burner at an outlet; and directing a capture medium to the soot stream, the capture medium contacting the soot in an impact region, the soot having a temperature greater than 50° C. in the impact region.

According to at least one feature of the present disclosure, a method of capturing soot includes the steps of: combusting a first precursor in a burner to produce a soot stream including soot; and passing a capture medium into the soot stream proximate the burner such that the soot is captured in the capture medium and forms a slurry.

According to another feature of the present disclosure, a method of capturing soot includes the steps of: combusting a first precursor in a burner to produce a soot stream including soot; passing a capture medium into the soot stream proximate the burner such that the soot is captured in the capture medium and forms a slurry; and recirculating the slurry through the soot stream such that the slurry is from about 20 wt % to about 80 wt % soot.

According to another feature of the present disclosure, a method of capturing soot includes the steps of: combusting a first precursor comprising a silicon-containing compound and a second precursor in a burner to produce a soot stream comprising soot; passing water as a vapor and aerosol into the soot stream proximate the burner such that the soot is captured in the water and forms a slurry; recirculating the slurry through the soot stream such that the slurry is from about 20 wt % to about 80 wt % soot; and mixing a second slurry with the slurry, wherein the second slurry has a different soot wt % than the slurry.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
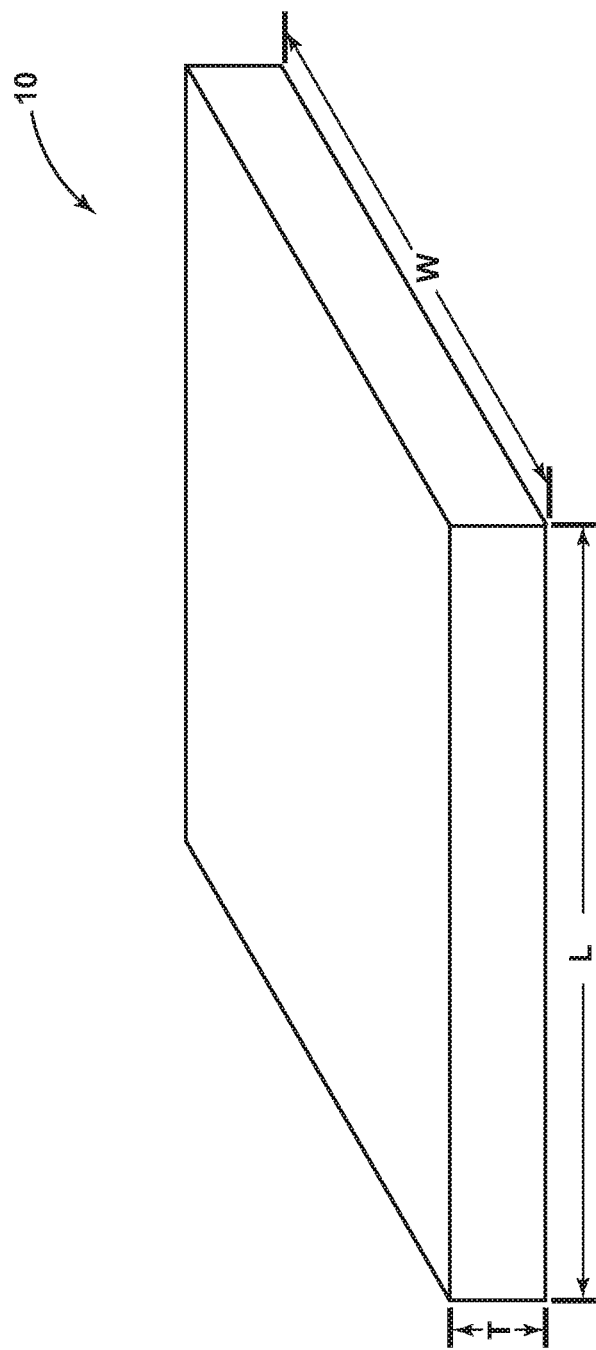
FIG. 1 is a schematic view of an optical element, according to at least one example.

Additional features and advantages of the disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring now to FIG. 1, depicted is an article 10. The article 10 may be composed of a glass, a glass-ceramic or ceramic material. The article 10 may include Si, Al, Ti, Zn, Ge, Er, Nd, Bi, Sb, Yb, Rb, oxides thereof and/or combinations thereof. According to various examples, the article 10 may be doped within one or more halogens (e.g., F) and/or OH. It will be understood that the glass article 10 may include $SiO_2$ at balance with the other constituents of the glass article 10. The article 10 may be a variety of components. For example, the article 10 may be a lens, a photomask blank, optical fibers, a glass substrate, planar-waveguides, other components and/or combinations thereof.

The composition of the article 10 may have a low variation across the article 10. For example, the composition of one or more of the constituents of the glass article 10 may vary over between any two points of the article 10 by about ±0.20 wt %, or about ±0.18 wt %, or about ±0.16 wt %, or about ±0.14 wt %, or about ±0.12 wt %, or about ±0.10 wt %, or about ±0.09 wt %, or about ±0.08 wt %, or about ±0.07 wt %, or about ±0.06 wt %, or about ±0.05 wt %, or about ±0.04 wt %, or about ±0.03 wt %, or about ±0.02 wt %, or about ±0.01 wt % or any and all values and ranges therebetween. The variation in composition across the article 10 may be expressed as a standard deviation and is calculated as the square root of variance by determining the variation between each composition relative to the average composition of the article 10 at each point measured. The compositional standard deviation of one or more of the constituents of the article 10 may be from about 0.001 wt % to about 0.02 wt %, or from about 0.001 wt % to about 0.015 wt %, or from about 0.001 wt % to about 0.010 wt %, or from about 0.001 wt % to about 0.005 wt % or any and all values and ranges therebetween.

The article 10 may have a length L and/or width W of from about 1 cm to about 10 m, or from about 1 cm to about 5 m, or from about 1 cm to about 1 m, or from about 1 cm to about 50 cm, or from about 1 cm to about 10 cm or any and all values and ranges therebetween. The article 10 may have a thickness T of about 0.2 cm, or about 0.4 cm, or about 0.6 cm, or about 0.8 cm, or about 1.0 cm or any and all values and ranges therebetween. It will be understood that the article 10 may be larger than the above-noted dimensions and may be sectioned or cut to provide one or more articles 10 of the above-noted sizes. The compositional variations noted above apply to article 10 having any of the sizes (length, and/or width and/or thickness) disclosed herein.

According to various examples, the article 10 may be free or substantially free of gas seeds, solid inclusions (e.g., compositional or optical inhomogeneities) or other defects.

Figure 2:
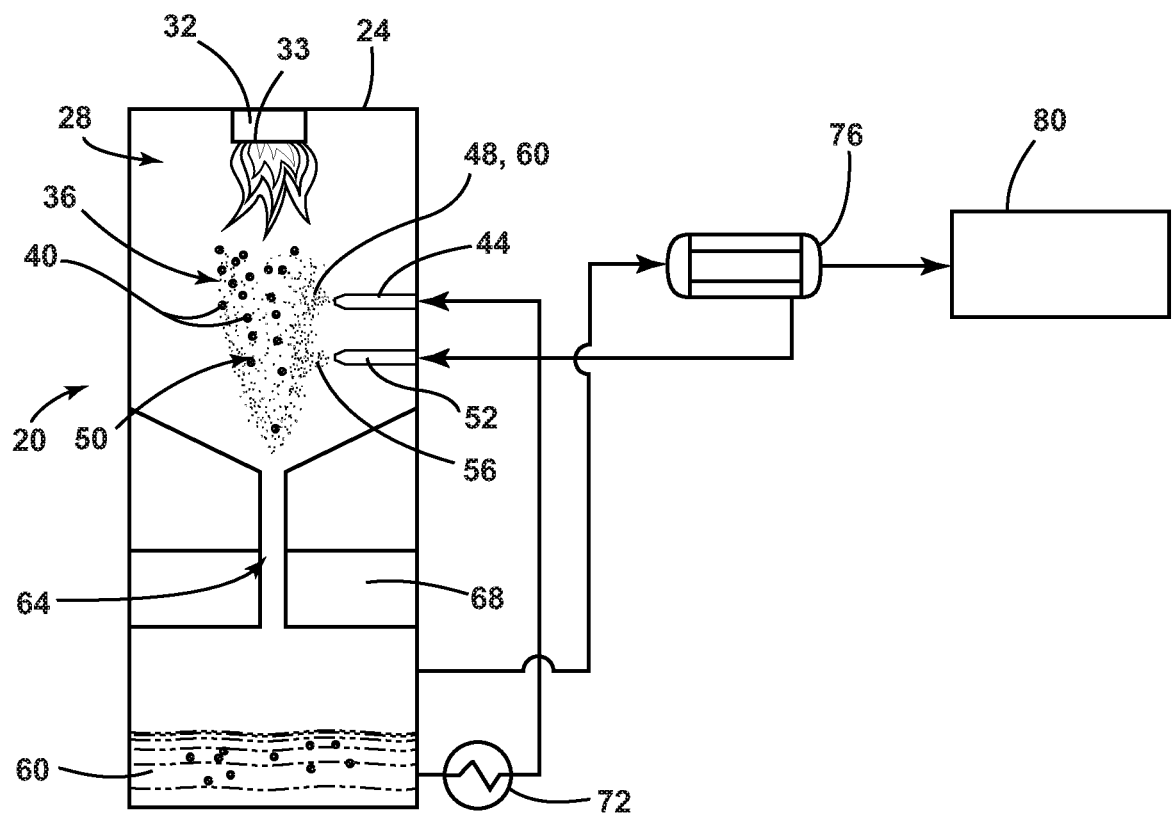
FIG. 2 is a schematic view of a soot generation and capture system, according to at least one example.

Referring now to FIG. 2, depicted is a soot generation and capture system 20 used in the formation of the article 10. The system 20 includes a container 24 defining a chamber 28 and a burner 32. According to various examples, a cooling jacket may be positioned around the container 24 and configured to remove heat from the system 20. In the depicted example, the burner 32 is positioned at a top of the chamber 28, but it will be understood that the burner 32 may be positioned at other locations within the chamber 28 of the container 24. For example, the system 20 may be positioned horizontally or on an incline such that that the burner 32 may be positioned on a side of the system 20. The burner 32 is configured to burn or oxidize one or more vapors or precursors to produce a soot stream 36 of a soot 40. The soot stream 36 exits the burner 32 at an outlet 33. A slurry nozzle 44 is positioned proximate the outlet 33 of the burner 32 and is configured to spray a capture medium 48 into the soot stream 36. The capture medium 48 contacts with the soot stream 36 at an impact region 50. For example, a tip of the slurry nozzle 44 where the capture medium 48 is sprayed from may be within a distance of about 1 cm, or about 10 cm, or about 100 cm, or about 1 m from the outlet 33 of the burner 32. A condensate nozzle 52 is positioned proximate the outlet 33 of the burner 32 and the slurry nozzle 44, and is configured to spray a condensate 56 into the soot stream 36. It will be understood that while the capture medium 48 and the condensate 56 are described as being sprayed into the soot stream 36, the capture medium 48 and/or the condensate 56 may be added to the soot stream 36 in a nebulized form, in an ultrasonically vaporized form, as a stream of liquid, other methods and/or combinations thereof without departing from the teachings provided herein. According to various examples, the condensate nozzle 52 may be positioned further away from the outlet 33 of the burner 32 than the slurry nozzle 44 (i.e., downstream from the slurry nozzle 44) or closer to the outlet 33 of the burner 32 than the slurry nozzle 44 (i.e., upstream of the slurry nozzle 44). As will be explained in greater detail below, the capture medium 48 and the condensate 56 sprayed from the slurry nozzle 44 and the condensate nozzle 52, respectively, are configured to capture the soot 40 of the soot stream 36 to form a slurry 60. Although the slurry 60 is depicted as collecting within the chamber 28, it will be understood that the slurry 60 may be held in a separate holding chamber without departing from the teachings provided herein. The slurry 60 is formed as the condensate 56 and/or the capture medium 48 intermix in or combine with the soot stream 36 at the impact region 50 to capture the soot 40. The formation of the slurry 60 is further aided as the slurry 60, soot stream 36, capture medium 48 and condensate 56 are passed through a constriction 64 defined by a blockage 68. The system 20 may also include a heat exchanger 72, a condenser 76 and a pollution abatement system 80 as explained in greater detail below.

Figure 3A:
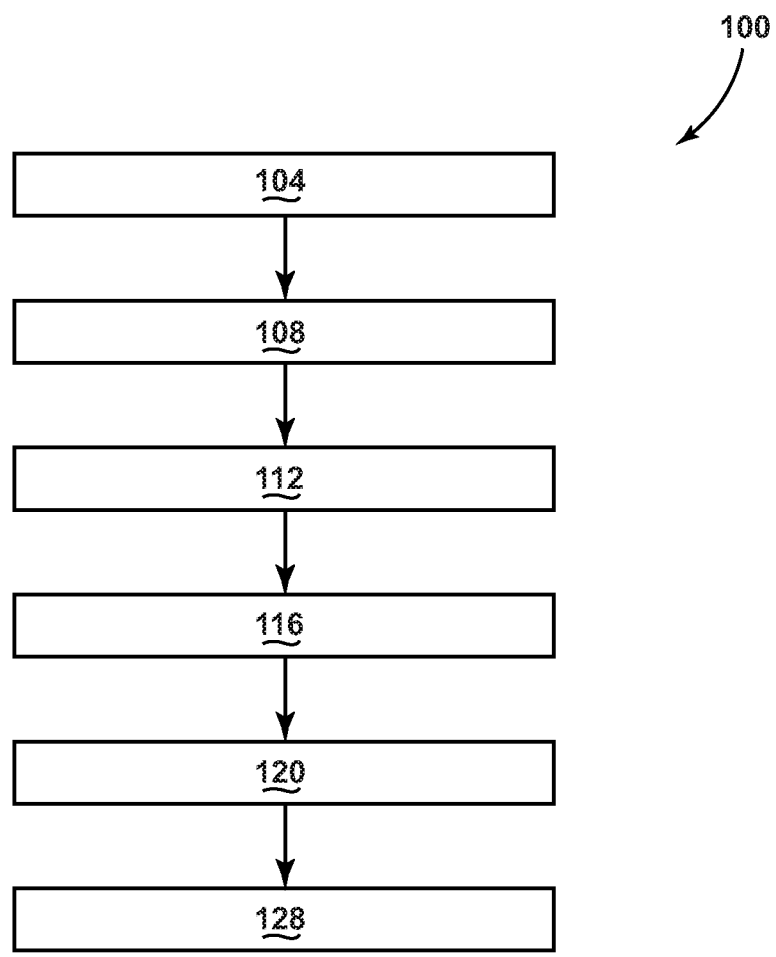
FIG. 3A is a flowchart of a method, according to at least one example.

Referring now to FIGS. 2 and 3A, depicted is a method 100 of capturing the soot 40. The method 100 may begin with a step 104 of combusting a first precursor and/or a second precursor in the burner 32 to produce the soot stream 36 including the soot 40. Although described herein as including two precursors, it will be understood that the method 100 may equally include a single precursor or more than two precursors (e.g., up to five or more separate precursors) which are combusted in the burner 32 without departing from the teachings provided herein. The first and/or second precursors may be in the form of liquids, vapors and/or gasses.

According to various examples, the first precursor may include a silicon-containing compound. The silicon-containing compound may include octamethylcyclotetrasiloxane (OMCTS), other siloxane compounds, organosilanes, silicon carbide (SiC), silicon monoxide (SiO), silicon nitride ($Si_3N_4$), silicon tetrabromide ($SiBr_4$), silicon tetrachloride ($SiCl_4$), silicon tetraiodide ($SiI_4$), silica ($SiO_2$), silicon tetraisocyanate ($Si(NCO)_4$), other silicon-bearing compounds and/or combinations thereof. The silicon-containing compound is configured to combust and produce $SiO_2$ soot 40. Additionally or alternatively, the first precursor may include a compound configured to produce soot 40 including at least one of Ti, Si, Mg, Fe, P and/or Ca when combusted.

According to various examples, the second precursor may include a titanium-containing compound. The titanium-containing compound may include titanium isopropoxide ($Ti(OC_3H_7)_4$ (TPT)), titanium ethoxide ($Ti(OC_2H_5)_4$), titanium 2-ethylhexyloxide ($Ti[OCH_2CH(C_2H_5)C_4H_9]_4$), titanium cyclopenthyloxide ($Ti(OC_3H_9)_4$), titanium amides ($Ti(NR_2)_4$), other titanium-bearing compounds and/or combinations thereof. Additionally or alternatively, the second precursor may include a compound configured to produce soot 40 including at least one of Ge, Er, Al, Nd, Bi, Sb, Ti, Yb and/or Rb when combusted. Further, it will be understood that one or more precursors or vapors of the dopants outlined above may be supplied to the burner 32. It will be understood that the relative molar amounts of the first precursor and the second precursor supplied to the burner 32 may be roughly equal to the desired composition (e.g., Si and Ti) of the article 10.

The first precursor and the second precursor may be separately converted to vapor form and carried to a mixing manifold by a carrier gas, such as nitrogen. The mixture passes via fume lines, into a flame produced by the burner 32. The burner 32 may also have a fuel (e.g., $CH_4$) and an oxidizer (e.g., $O_2$) carried to the flame in order to facilitate combustion. The combustion of the first precursor and the second precursor in the burner 32 produces the soot stream 36 carrying the soot 40. The soot 40 may have a size (i.e., largest diameter, linear dimension, or length) of from about 0.001 μm to about 0.8 μm, or from about 0.002 μm to about 0.7 μm, or from about 0.003 μm to about 0.6 μm, or from about 0.004 μm to about 0.5 μm, or from about 0.005 μm to about 0.4 μm or any and all values and ranges therebetween. In examples where dopants are provided to the burner 32, the soot 40 may also include particles of the dopants.

As the burner 32 is combusting the first and second precursors, a step 108 of passing or directing the capture medium 48 into the soot stream 36 proximate the outlet 33 of the burner 32 such that the soot 40 is captured in the capture medium 48 and forms the slurry 60 is performed. The outlet 33 of the burner 32 and the tip of slurry nozzle 44 may have a distance from one another of about 1 meter or less, or about 1 foot or less, or about 1 inch or less or about 1 cm or less. At a beginning of the method 100, the capture medium 48 may start in the bottom of the chamber 28 and be pumped to the slurry nozzle 44. It will be understood that the as yet unused capture medium 48 may also be stored exterior to the chamber 28 without departing from the teachings provided herein. The capture medium 48 may be composed of deionized water or other liquids capable of withstanding the elevated temperatures of the soot stream 36. As will be explained in greater detail below, as the capture medium 48 becomes increasingly laden with the soot 40, the capture medium becomes the slurry 60 which is a suspension of the soot 40 in the capture medium 48. Further, as the system 20 may later recirculate the capture medium 48 containing the soot 40 (i.e., now the slurry 60) through the soot stream 36 from the slurry nozzle 44, it may be said that the capture medium 48 and/or the slurry 60 is recirculated through the soot stream 36.

The capture medium 48 may be passed or directed into the soot stream 36 at the impact region 50. The impact region 50 is the area at which the capture medium 48 first contacts or mixes with the soot stream 36 to form the slurry 60. The distance between the outlet 33 of the burner 32 and the impact region 50 may be about 1 cm or less, or about 5 cm or less, or about 10 cm or less, or about 1 m or less or any and all values and ranges therebetween. For example, the impact region 50 may be from about 1 cm to about 1 m from the outlet 33 of the burner 32. As the impact region 50 may be proximate the outlet 33 of the burner 32, the soot 40 may have an elevated temperature in the impact region 50 and as the capture medium 48 contacts the soot 40. For example, the soot 40 may have a temperature of about 50° C. or greater, or about 75° C. or greater, or about 100° C. or greater, or about 150° C. or greater, or about 200° C. or greater, or about 250° C. or greater, or about 300° C. or greater, or about 350° C. or greater, or about 400° C. or greater or any and all values and ranges therebetween. For example, the temperature of the soot 40 in the impact region 50 may be from about 50° C. to about 400° C., or about 50° C. to about 300° C., or about 50° C. to about 200° C. or about 50° C. to about 150° C., or about 50° C. to about 100° C.

The capture medium 48, and therefore the slurry 60 formed when the capture medium 48 combines with the soot 40, may include one or more dispersants configured to increase the particle separation or reduce clumping of the soot 40 within the capture medium 48. As used herein, a dispersant is a surface-active substance present in a suspension, which is usually a colloid, to improve the separation of particles (e.g., the soot 40) and to prevent settling or clumping so that a uniform dispersion of particles (e.g., the soot 40) is present in the slurry 60. According to various examples, the one or more dispersants may include a surfactant. The dispersant may include ammonium citrate, polyurethanes, polyacrylates, anionic dispersants, cationic dispersants, electroneutral dispersants, nonionic dispersants, other dispersants and/or combinations thereof. Additionally or alternatively, the capture medium 48, and therefore the slurry 60, may include one or more organic bases. The organic base may include tetramethylammonium hydroxide, choline hydroxide, organolithium compounds, Grignard reagents (e.g., alkyl, vinyl, or aryl-magnesium halides), amines, tetraalkylammonium hydroxides, phosphonium hydroxides, metal alkoxides, metal amides, metal silanoates, other bases and/or combinations thereof. The capture medium 48 and/or slurry 60 may have a pH of from about 9 to about 14, or from about 9 to about 13, or from about 10 to about 13, or from about 11 to about 13, or from about 12 to about 13. Further, one or more pollution abatement compounds may be added to the capture medium 48. For example, a pollution abatement compound may include one or more compounds which is configured to capture, sequester, neutralize, decompose and/or otherwise reduce pollutants in the soot stream 36. For example, in situations where the soot stream 36 includes HCl, NOR, volatile organic compounds or the like, pollution abatement compounds such as oxidizers may be included in the capture medium 48.

According to various examples, the capture medium 48 is sprayed from the slurry nozzle 44 into the soot stream 36 as both a vapor and an aerosol. In a vapor, the capture medium 48 is in a gas phase and a temperature lower than its critical temperature. As such, the capture medium 48 can be condensed to a liquid. In an aerosol, the capture medium 48 is a suspension of fine liquid droplets. The droplets of the aerosolized capture medium 48 may have a diameter about 10 μm or less, about 9 μm or less, about 8 μm or less, about 7 μm or less, about 6 μm or less, about 5 μm or less, about 4 μm or less, about 3 μm or less, about 2 μm or less, about 1 μm or less, or about 0.9 μm or less. As the capture medium 48 and the soot stream 36 mix or combine, the particles of the soot 40 impact on the droplets of the aerosolized capture medium 48 and get collected as the slurry 60 as they follow in the chamber 28. Further, as the vapor phase of the capture medium 48 mixes or combines with the soot stream 36, the vapor phase of the capture medium 48 may condense on the soot 40 as the temperature of the soot stream 36 cools. As such, the soot 40 with the condensed capture medium 48 may agglomerate to form droplets which may in turn condense with other droplets (e.g., aerosolized capture medium 48 and soot 40 and/or condensed capture medium 48 on the soot 40) to form the slurry 60 which is collected at the bottom of the chamber 28.

Once the capture medium 48 has been sprayed into the soot stream 36, a step 112 of passing the soot stream 36 and the capture medium 48 through the constriction 64 defined by the blockage 68 is performed. The constriction 64 is an aperture or opening defined by the blockage 68. The blockage 68 may take a variety of configurations. Although depicted as a separate component than the container 24, it will be understood that the blockage 68 may be part of the container 24 (i.e., inward-facing walls or baffles) without departing from the teachings provided herein. The blockage 68 may define one or more tapered or slanted surfaces leading to the constriction 64 in order to guide the soot stream 36, soot 40, capture medium 48, condensate 56 and slurry 60 to the constriction 64. The constriction 64 may have a generally circular, oval, oblong, triangular, square, rectangular, pentagonal or higher order polygon shape. Further, the blockage 68 may define a plurality of constrictions 64 such that the blockage 68 is a mesh or screen. According to various examples, the constriction 64 is smaller than a diameter of the soot stream 36. As such, movement of the soot stream 36, soot 40, capture medium 48, condensate 56 and slurry 60 through the constriction 64 may generate turbulence, an increased speed of the soot stream 36 and the capture medium 48, and generally create conditions which increase the mixing of the soot stream 36, soot 40, capture medium 48, condensate 56 and slurry 60. For example, the increased speed of the soot stream 36 as it passes through the constriction 64 may increase the impact velocity between the capture medium 48 and the soot 40 such that the soot 40 is captured. Such a feature may be advantageous in increasing the amount of soot 40 from the soot stream 36 which is captured within the capture medium 48 by the above-noted processes to form the slurry 60. The constriction 64 of the blockage 68 may extend for a length to ensure sufficient mixing of the soot stream 36, soot 40, capture medium 48, condensate 56 and slurry 60.

As explained above, capture of the soot 40 by the capture medium 48 results in the formation of the slurry 60. The slurry 60 is collected in a bottom portion of the chamber 28. The slurry 60 collected after the first time the capture medium 48 and the soot stream 36 are introduced may have a concentration of soot 40 of from about 1 wt % to about 50 wt %, or from about 1 wt % to about 40 wt %, or from about 1 wt % to about 30 wt %, or from about 1 wt % to about 20 wt %, or from about 1 wt % to about 10 wt %, or from about 1 wt % to about 5 wt % or any and all values and ranges therebetween.

Once an appreciable amount of slurry 60 has been captured at the bottom of the chamber 28, a step 116 of recirculating the slurry 60 through the soot stream 36 is performed. During step 116, the slurry 60 may be pumped from the bottom of the chamber 28 or other holding tank, through the heat exchanger 72 and back through the slurry nozzle 44. The heat exchanger 72 may cool the slurry 60 from a temperature of from about 90° C. to about 110° C. to a temperature of from about 20° C. to about 60° C., or from about 30° C. to about 50° C. For example, upon exiting heat exchanger 72, the slurry 60 may have a temperature of about 20° C., or about 22° C., or about 24° C., or about 26° C., or about 28° C., or about 30° C., or about 32° C., or about 34° C., or about 36° C., or about 38° C., or about 40° C., or about 42° C., or about 44° C., or about 46° C., or about 48° C., or about 50° C., or about 52° C., or about 54° C., or about 56° C., or about 58° C., or about 60° C. or any and all values and ranges therebetween.

Similar to the capture medium 48, the slurry 60 may be sprayed into the soot stream 36 in an aerosol and/or vapor form. The slurry 60, when sprayed into the soot stream 36, functions similarly to the capture medium 48 in collecting soot 40 from the soot stream 36 by impacting the soot 40 (i.e., aerosolized slurry 60) and/or condensing on the soot 40 (i.e., vapor form slurry 60). By recirculating and spraying the slurry 60 into the soot stream 36, the wt % of soot 40 present in the slurry 60 may be increased. The slurry 60 is recirculated through the soot stream 36 until the slurry 60 has a wt % of soot 40 of from about 20 wt % to about 80 wt %, or from about 30 wt % to about 80 wt %, or from about 40 wt % to about 80 wt %, or from about 30 wt % to about 70 wt %, or from about 50 wt %. For example, the slurry 60 may be recirculated through the soot stream 36 until the slurry 60 has a wt % of soot 40 of about 20 wt %, or about 22 wt %, or about 24 wt %, or about 26 wt %, or about 28 wt %, or about 30 wt %, or about 32 wt %, or about 34 wt %, or about 36 wt %, or about 38 wt %, or about 40 wt %, or about 42 wt %, or about 44 wt %, or about 46 wt %, or about 48 wt %, or about 50 wt %, or about 52 wt %, or about 54 wt %, or about 56 wt %, or about 58 wt %, or about 60 wt %, or about 62 wt %, or about 64 wt %, or about 66 wt %, or about 68 wt %, or about 70 wt %, or about 72 wt %, or about 74 wt %, or about 76 wt %, or about 78 wt %, or about 70 wt % or any and all values and ranges therebetween. It will be understood that the slurry 60 may be recirculated through the soot stream 36 a single time or a plurality of times in order to reach the final wt % of soot 40 in the slurry 60. The final wt % of soot 40 in the slurry 60 may be based on a predetermined amount of soot 40 in the slurry 60 and/or until the viscosity of the slurry 60 becomes too great to be handled by pumps (e.g., pumps moving the slurry 60) and/or slurry nozzle 44.

Simultaneously with step 112 and/or step 116, a step 120 of condensing the soot stream 36 and the capture medium 48 to the condensate 56 and a step 128 of passing the condensate 56 through the condensate nozzle 52 and into the soot stream 36 proximate the outlet 33 of the burner 32 may be performed. In operation, a portion of the soot stream 36, the soot 40, the capture medium 48 and/or the slurry 60, may not be captured and collect at the bottom of the chamber 28 as the slurry 60. Such an uncaptured portion may still exist as a gas or vapor phase in the chamber 28. As such, the remaining portion of the soot stream 36 and the capture medium 48 and/or slurry 60 may be passed through the condenser 76. The condenser 76 is configured to condense vaporized liquids (e.g., the capture medium 48, water or byproducts present as a result of the combustion at the burner 32, and or slurry 60) into the condensate 56. As such, the condensate 56 may contain a mixture of the capture medium 48 and/or water (or other liquids) and any soot 40 still present in the soot stream 36. The condensate 56 is passed back into the soot stream 36 proximate the outlet 33 of the burner 32 through the condensate nozzle 52. It will be understood that similar to the slurry 60, the condensate 56 may be passed cooled to a predetermined temperature. Similar to the slurry nozzle 44, the condensate nozzle 52 is configured to pass the condensate 56 as an aerosol and/or as a vapor. Use of the condenser and the condensate nozzle 52 may be advantageous in retaining the amount of capture medium 48 within the system 20 (i.e., as it is not exhausted out of the system 20) while simultaneously being used to capture additional soot 40 from the soot stream 36. Gases of the soot stream 36 may then be passed to the pollution abatement system 80 where any remaining soot 40 present in the gases may be filtered out or scrubbed and the gases exhausted.

Once the slurry 60 has a predetermined wt % of the soot 40 in the slurry 60, the slurry 60 may be removed from the system 20 and stored.

Figure 3B:
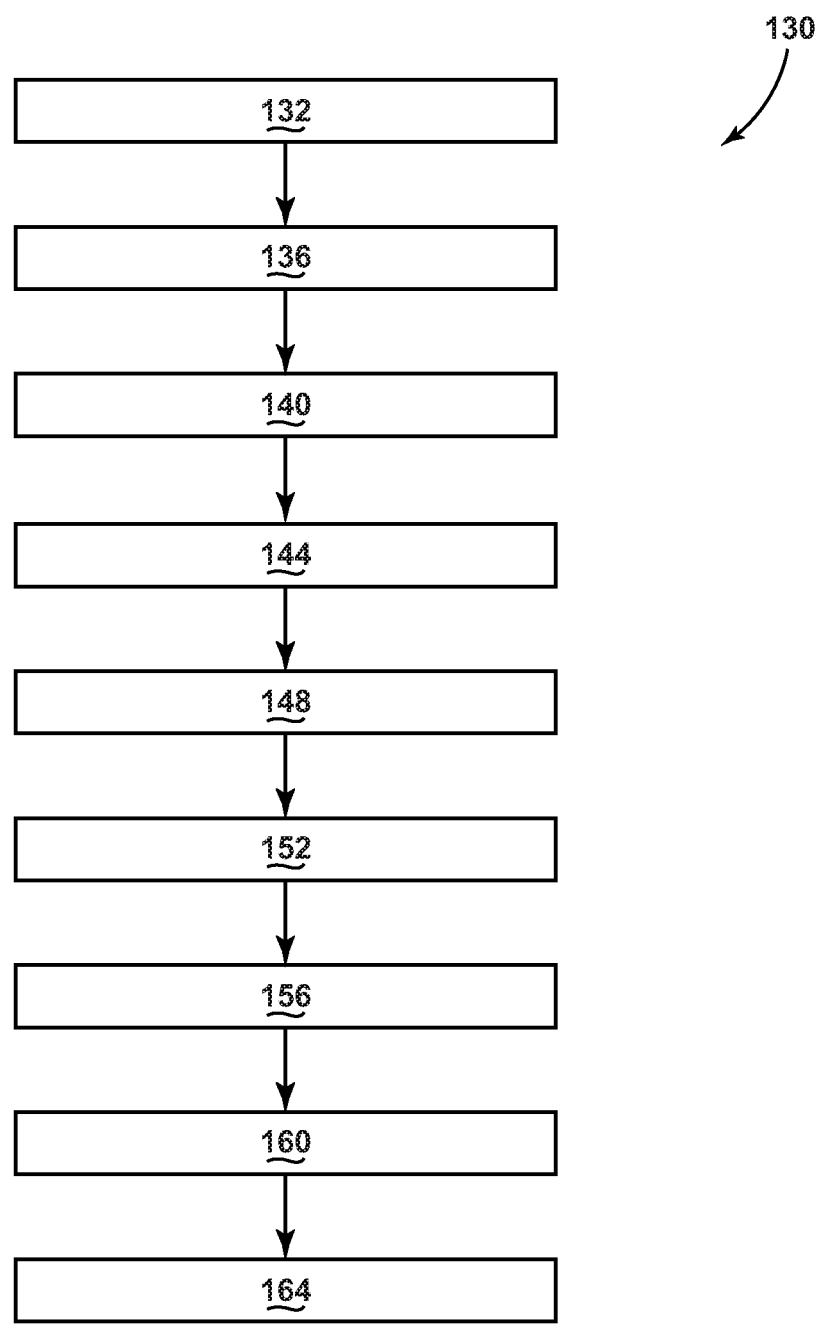
FIG. 3B is a flowchart of an article forming method, according to at least one example.
Figure 4:
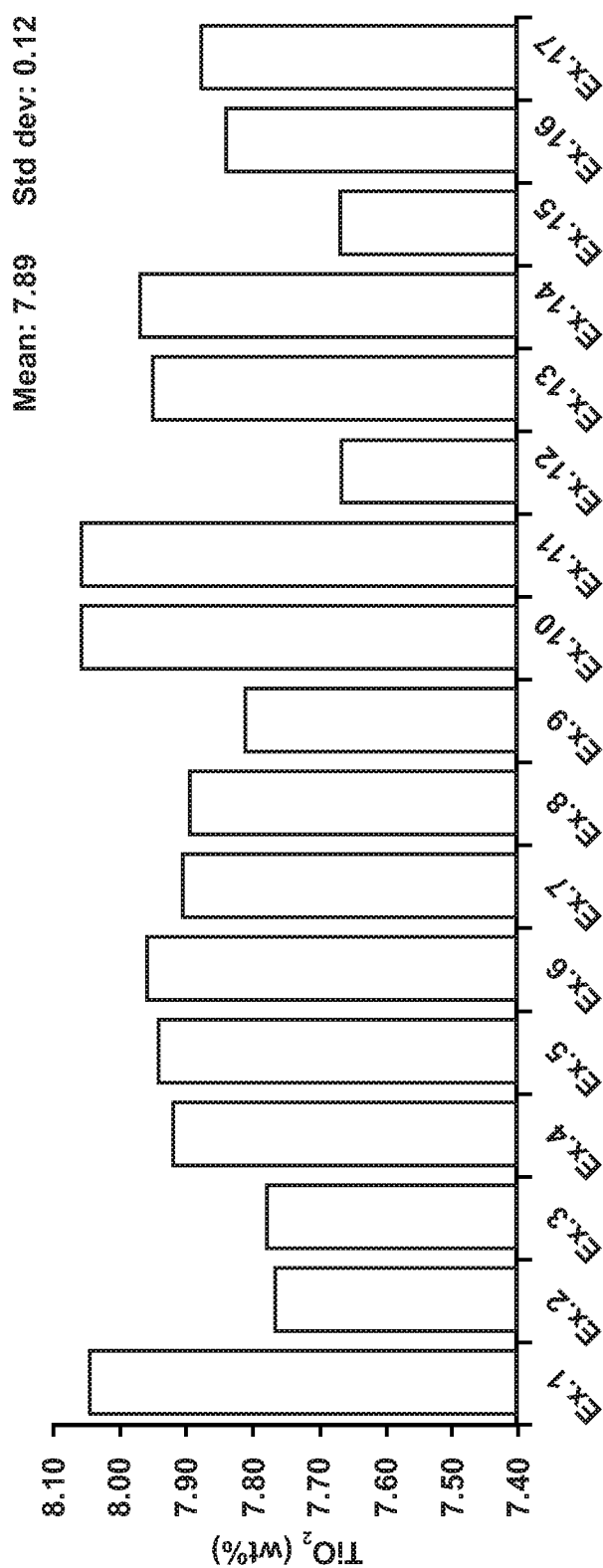
FIG. 4 is a bar chart of a first set of comparative examples.
Figure 5:
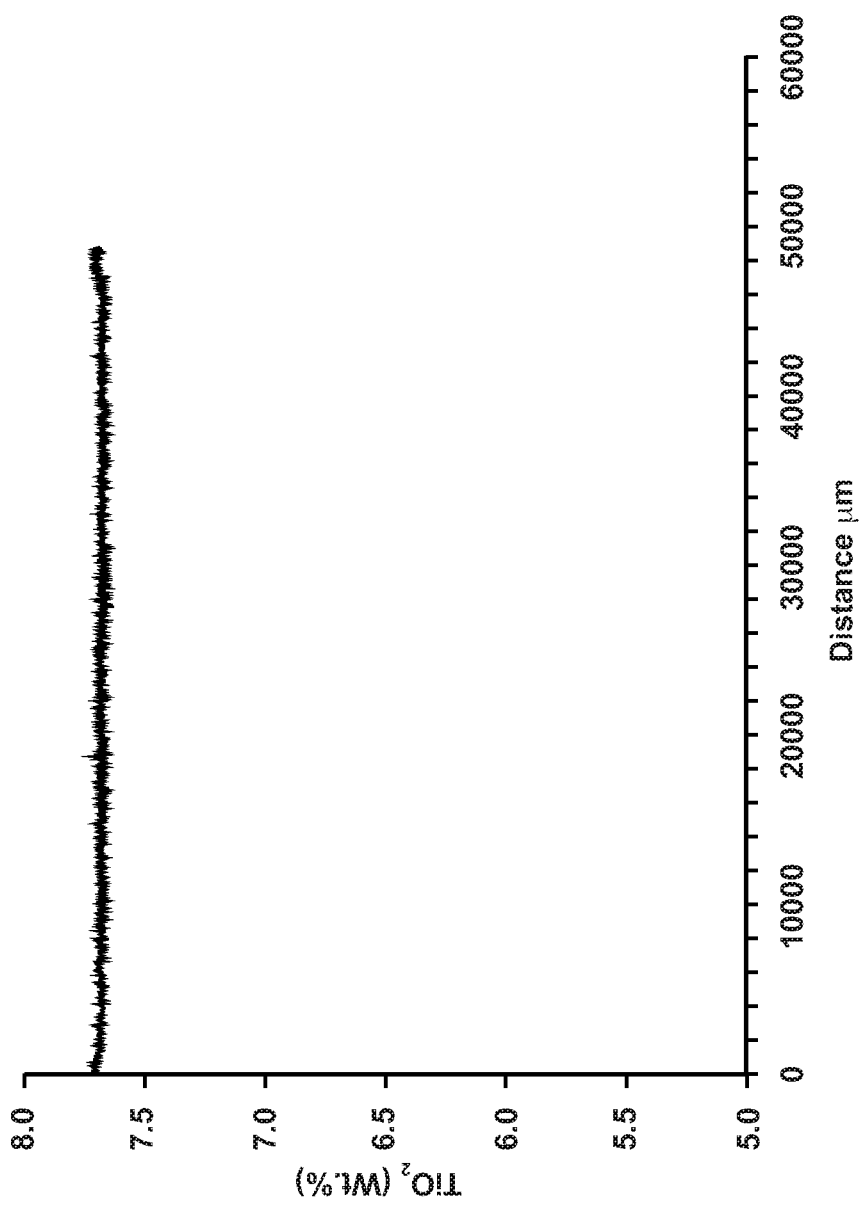
FIG. 5 is a plot of a compositional line scan of an example consistent with the present disclosure.

Referring now to FIG. 3B, depicted is an article forming method 130. In the depicted example, the forming method 130 may be referred to as a "sol-gel" process, but it will be understood that the article forming method 130 may be a variety of manufacturing processes of the article 10 using the soot 40 and/or the slurry 60. As such, the sol-gel process is only one of many examples of the article forming method 130. For example, the soot 40 may be utilized in a soot pressing process (e.g. to form optical fiber preforms or substrates) and/or the slurry 60 may be used as a feedstock in suspension plasma spraying for a coating application.

Variations in the operation of the system 20 may cause the composition (e.g., the relative wt % of $SiO_2$ to $TiO_2$ of soot 40 or the wt % of soot 40 in the slurry 60 to vary from process run to process run. As such, the composition of the slurry 60 may deviate from that of the desired composition of the article 10 or the wt % of soot 40 in the slurry 60 may deviate from a desired soot wt % for formation of the glass article 10. In such an example, the article forming method 130 may begin with an optional step 132 of mixing a second slurry (i.e., formed during a different process run of the system 20 or method 100) with the slurry 60. In such an example, the second slurry may have a different soot wt % than the slurry 60, or may have a different compositional make up (e.g., different relative amounts of $SiO_2$ and $TiO_2$ and/or different dopants or constituents) compared to the slurry 60. Such a feature may be advantageous in achieving the desired composition of the slurry 60 and the desired wt % of soot 40 in the slurry 60. Further, mixing of various batches of the slurry 60 may be advantageous in decreasing the production of slurry 60 which is ultimately wasted due to non-conformity with predetermined specifications.

Once the slurry 60 is at a predetermined wt % of soot 40 and has a predetermined composition (i.e., through use of a single slurry 60 or the mixing of slurries 60), a step 136 of filtering the slurry 60 through a filter or a mesh screen may performed. Filtering of the slurry 60 is configured to remove contaminants and/or to break agglomerations of the soot 40 present in the slurry 60 into smaller (e.g., less than 1 μm) particle aggregate sizes. In such an operation, the mesh screen may be composed of stainless steel or other materials which will not contaminate the slurry 60. According to various examples, the mesh screen may be configured to filter out particle aggregates having a size (i.e. longest linear dimension) of about 10 μm or greater. Filtering of the slurry 60 can be assisted by applying a pressure differential across the mesh screen (i.e., pressure filtration or vacuum filtration). If the contaminants are large or numerous enough such that the openings of the mesh screen get plugged, the mesh screen can be cleaned manually or by temporarily reversing the flow of the slurry 60 through the mesh screen to dislodge the contaminants. Additionally or alternatively, Stokes settling can separate large or dense contaminants or particle aggregates from the slurry 60. Filtering of the slurry 60 may advantageously result in a stirring of the slurry 60. Stirring of the slurry 60 may improve the compositional homogeneity by preventing stratification and/or agglomeration of certain types of soot 40 (e.g., $SiO_2$ vs $TiO_2$ particles). It will be understood that step 136 may be carried out by recirculating the slurry 60 in the system 20 for some amount of time after the soot generation has been stopped (i.e., the burner 32 is no longer producing the soot stream 36) or by using a separate mixing vessel. It will be understood that step 136 of filtering the slurry 60 may be performed a plurality of times during the method 100 without departing from the teachings provided herein.

Next, a step 140 of generating a vacuum over the slurry 60 is performed. Generation of the vacuum has the effect of removing adsorbed or trapped gases from the soot 40 by holding the slurry 60 in a vacuum. In other words, the slurry 60 is degassed in step 140. The soot 40 that is generated by the combustion process at the burner 32 has a relatively high surface area and therefore may adsorb gas at its surface. This gas is entrained into the slurry 60 as the soot 40 is captured, but can be removed by evacuating the space above the slurry 60. According to various examples, the generation of the vacuum above the slurry 60 may take place in a dedicated vessel downstream of system 20. The vacuum level above the slurry 60 may be modulated in order to accelerate the breaking up of bubbles forming at the surface of the slurry

60. The vacuum over the slurry 60 may have a pressure of from about 0.001 atm to about 0.999 atm, or from about 0.1 atm to about 0.9 atm, or from about 0.01 atm to about 0.8 atm, or from about 0.05 atm to about 0.7 atm, or from about 0.1 atm to about 0.6 atm, or from about 0.1 atm to about 0.5 atm, or from about 0.1 atm to about 0.4 atm, or from about 0.1 atm to about 0.3 atm, or from about 0.1 atm to about 0.2 atm, or from about 0.01 atm to about 0.5 atm or any and all values and ranges therebetween. Step 140 of generating the vacuum may be performed for about 30 seconds, or about 1 minute, or about 2 minutes, or about 3 minutes, or about 4 minutes, or about 5 minutes, or about 6 minutes, or about 7 minutes, or about 8 minutes, or about 9 minutes or about 10 minutes, or about 11 minutes or greater than about 11 minutes. It will be understood that step 140 of generating the vacuum over the slurry 60 may be performed a plurality of times during the forming method 130.

Once the slurry 60 is degassed, a step 144 of adding a pH modifier to the slurry 60 is performed. It will be understood that the pH modifier may also be known as a pH shifter. The pH modifier is configured to reduce the pH of the slurry 60. In a typical embodiment, the slurry 60 is basic (e.g., due to the presence of a base or dispersant). The pH of the slurry 60 may be greater than 10.0, or greater than 10.5, or greater than 11.0, or greater than 11.5, or greater than 12.0. Reducing the pH of the slurry 60 toward neutral (e.g. to a pH less than 10.0, or less than 9.5, or less than 9.0, or less than 8.5, or less than 8.0) over some period of time. Shifting of the pH of the slurry 60 from basic to neutral may promote gelling or an increase of viscosity of the slurry 60. The pH modifier may include esters, formaldehyde, paraformaldehyde, formamide, glyoxal, methyl formate, methyl acetate, ethyl formate, ethyl acetate, organic acids, other pH modifiers and/or combinations thereof. The pH modifier may be added in small amounts to avoid developing regions of high concentration within the slurry 60 which would cause premature gelling at localized positions. Once the pH modifier is added to the slurry 60, the slurry 60 may optionally be filtered, stirred or degassed again.

Next, prior to full gelation of the slurry 60, a step 148 of casting the slurry 60 into a receptacle is performed. The receptacle may be near net shape to the ultimate shape of the glass article 10, or may be a shape from which the glass article 10 may be easily singulated. The receptacle may have a smooth surface which is in contact with the slurry 60 in order to prevent sticking or adherence of the slurry 60 to the receptacle. According to various examples, a mold release agent may be applied to the surface of the receptacle prior to the casting of the slurry 60 into the receptacle. The mold release agent may be dry polytetrafluoroethylene lubricant, wax, other dry lubricants, a wet lubricant, other lubricants and/or combinations thereof. The casting of the slurry 60 may be carried out so that gasses are not generated and/or entrained in the slurry 60 as it is cast into the receptacle. Casting of the slurry 60 into the receptacle with minimal entrained gasses may be accomplished by maintaining an unbroken stream of slurry 60 when transferring the slurry 60 from a container into the receptacle.

Once the slurry 60 is within the receptacle, a step 152 of gelling the slurry 60 to form a gelled body is performed. During gelling of the slurry 60, the receptacle may be covered tightly and the slurry 60 is allowed to gel. Gelling of the slurry 60 to form the gelled body may take from about 1 hour to about 36 hours, or from about 12 hours to about 30 hours, or from about 18 hours to about 24 hours. Gelling of the slurry 60 into the gelled body may be carried out at a temperature of from about 0° C. to about 100° C., or from about 0° C. to about 90° C., or from about 0° C. to about 80° C., or from about 0° C. to about 70° C., or from about 0° C. to about 60° C., or from about 0° C. to about 50° C., or from about 0° C. to about 40° C., or from about 10° C. to about 30° C., or from about 20° C. to about 40° C. or any and all values and ranges therebetween. The gelling of the slurry 60 may be increased as temperatures above ambient temperatures (e.g., about 23° C.) are used. Gelling of the slurry 60 may be complete once the pH of the slurry 60 is about 11.0 or less, or about 10.5 or less, or about 10.0 or less, or about 9.5 or less, or about 9.0 or less, or about 8.5 or less, or about 8.0 or less, or about 7.5 or less or any and all values and ranges therebetween. Shrinkage of the slurry 60 during the gelling process may occur and can cause cracking of the gelled body, especially where the gel tends to adhere to the receptacle. Minimization of this cracking may be achieved through the above-noted use of a mold release material and/or the receptacle having smooth surfaces in contact with the slurry 60. According to some examples, the slurry or gelled body is released from the receptacle as soon as it is gelled sufficiently to withstand removal.

Next, a step 156 of drying the gelled body to form a green body is performed. Step 156 may begin while the gelled body is still positioned in the receptacle or after the gelled body has been removed from the receptacle. In examples where drying of the gelled body begins in the receptacle, a lid of the receptacle may be raised (e.g., from about 1 mm to about 10 mm) to allow the evaporation of moisture in the gelled body. At this point the gelled body may shrink by a few percent (e.g., from about 2% to about 3% linearly). Regardless of whether or not the gelled body begins drying in the receptacle, the gelled body may be removed from the receptacle and placed on a substrate. The substrate may be composed of ultrahigh molecular weight high-density polyethylene with a plurality of polytetrafluoroethylene tape strips. The gelled body may be allowed to dry in air (e.g., at ambient temperatures) for an extended period of time (e.g., from about 2 days to about 3 days) until a water content within the gelled body reaches a predetermined amount and the gelled body becomes the green body. For example, the gelled body may be air dried until a water content of the gelled body is about 30 wt % or less, or about 29 wt % or less, or about 28 wt % or less, or about 27 wt % or less, or about 26 wt % or less, or about 25 wt % or less, or about 24 wt % or less, or about 23 wt % or less, or about 22 wt % or less, or about 21 wt % or less, or about 20 wt % or less, or about 19 wt % or less, or about 18 wt % or less or any and all values therebetween. Once the gelled body reaches the predetermined water content, the gelled body may be heated to remove the remaining water. According to various examples, the gelled body may be heated to from about 40° C. to about 80° C. for an extended period of time (e.g., about 24 hours) in air to remove the remaining water. Organic materials remaining in within the green body after the drying process may be removed by heating the green body to an elevated temperature for a period of time. For example, the green body may be heated to a temperature of from about 300° C. to about to 700° C., or from about 400° C. to about 600° C., or about 500° C. The green body may be heated for a time period of from about 2 hours to about 6 hours, or from about 3 hours to about 5 hours or about 4 hours.

Next, a step 160 of consolidating the green body to form the glass article 10 is performed. Consolidation of the green body to form the glass article 10 may be performed in a reduced-pressure atmosphere (e.g., less than or equal to about 10 Torr oxygen) and/or in an inert gas (e.g., helium, argon, neon, etc.). The green body may be consolidated at a temperature of from about 1100° C. to about 1500° C., or from about 1200° C. to about 1400° C., or from about 1250° C. to about 1350° C., or from about 1250° C. to about 1300° C. For example, consolidation may take place at a temperature of about 1100° C., or about 1150° C., or about 1200° C., or about 1250° C., or about 1300° C., or about 1350° C., or about 1400° C., or about 1450° C., or about 1500° C., or any and all values and ranges therebetween. Doping can be achieved by adding a partial pressure of steam or other dopants during the consolidation.

In $SiO_2$ and $TiO_2$ compositional examples, consolidation of the green body may result in a translucent glass article 10 due, for example, to the presence of titania nanocrystals. These nanocrystals can be dissolved in the glass article 10 through a step 164 of heating the glass article 10. The heating (i.e., or reheating since the glass article 10 had already been consolidated under heat) of the glass article 10 may be at a temperature of from about 1300° C. to about 1700° C., or from about 1400° C. to about 1600° C., or from about 1450° C. to about 1550° C. For example, the article 10 may be reheated to a temperature of about 1300° C., or about 1350° C., or about 1400° C., or about 1450° C., or about 1500° C., or about 1550° C., or about 1600° C., or about 1650° C., or about 1700° C. or any and all values and ranges therebetween. The reheating of the article 10 may be carried out for about 2 minutes, or about 4 minutes, or about 6 minutes, or about 8 minutes, or about 10 minutes, or about 12 minutes, or about 14 minutes, or about 16 minutes, or about 18 minutes, or about 20 minutes, or about 22 minutes, or about 24 minutes, or about 26 minutes, or about 28 minutes, or about 30 minutes, or about 32 minutes, or about 34 minutes, or about 36 minutes, or about 38 minutes, or about 40 minutes or any and all values and ranges therebetween. It will be understood that step 164 may be carried out for a time period of about 24 hours or greater without departing from the teachings provided herein. Reheating of the article 10 may result in the dissolution of the titania nanocrystals and produce a clear glass article 10. The glass article 10 may then be trimmed, ground and polished. Further, the glass article 10 may be cut or singulated to form a plurality of glass articles 10.

Use of the presently disclosed soot generation and capture system 20, method 100 and forming method 130 may offer a variety of advantages.

First, use of the slurry nozzle 44 and the condensate nozzle 52 proximate the outlet 33 of the burner 32 may reduce the temperature of the soot stream 36 and soot 40 prior to reaching the pollution abatement system 80. Gases and soot 40 of the soot stream 36 are generated at high temperatures (e.g., about 1800° C.) at the burner 32 during combustion. Particles of soot 40 which reach the pollution abatement system 80 at these elevated temperatures may damage bags, filters and other components. By spraying the capture medium 48, slurry 60 and condensate 56 into the soot stream 36 proximate the burner 32, the temperature of the gases and soot 40 which eventually reach the pollution abatement system 80 may be drastically decreased such that damage to the pollution abatement system 80 may be minimized and/or eliminated. Further, as the system 20 is cooled by the capture medium 48, the present disclosure may offer a more compact and space efficient design than conventional air-cooled systems.

Second, as the soot 40 is captured in the capture medium 48 and is mixed, stirred or otherwise homogenized, better compositional uniformity of the resulting glass article 10 may be achieved. Conventional photomask blanks are produced by burning a combined flow of OMCTS and TPT and either collecting or depositing the resultant particles. As the ratio of the OMCTS and TPT can vary over time, compositional variations of Si and/or Ti within the particles of soot 40 collected or deposited may result in non-uniform regions within a single photomask or the composition of the photomasks may vary across a production run. As such, each conventional individual photomask may need to be validated for composition and each may require a unique post-fabrication heat treatment to achieve the target properties (e.g., clarity and/or cross-over temperature). Using the present disclosure, the soot 40 generated from an entire run of the method 100 would be captured into the slurry 60 which would then be homogenized by mixing the slurry 60. Such a feature may be advantageous in ensuring that the composition of the articles 10 produced using the method 100 all have the same composition and thus the same heat treatment cycle and optical properties.

Third, capturing of the soot 40 in the capture medium 48 leads to less agglomeration of the soot 40. In conventional soot generation processes, the particles of the soot 40 are captured onto fiber bags across which a pressure differential is applied. The particles are pressed onto the bags until an air pulse knocks the pressed soot off the bags and into a collection hopper. This pressing action, along with potentially high moisture levels from the combustion by-products, can cause the particles to form agglomerates that survive the pressing process. The agglomerates may result in gas seeds and/or compositional inhomogeneities in the final article 10. Use of the method 100 allows for agglomerates to be dispersed away by mechanical mixing or removed by filtration of the slurry 60.

Fourth, use of the forming method 130 and system 20 allow for greater flexibility to adjust the composition of the slurry 60 and the resulting article 10. For example, the composition (e.g., $SiO_2$ to $TiO_2$ ratio and/or soot wt %) of the slurry 60 may be adjusted up or down by mixing a second slurry with a different composition with the slurry 60. Such adjustments may allow very precise control of the composition for tuning the final properties of the glass article 10.

Fifth, use of the present disclosure may offer less contamination relative to conventional processes. In conventional soot pressing processes, there may be no remediation possible to any contaminants that enter the burner exhaust gases and the dry soot is difficult to sift efficiently. Such contaminants include dust from the manufacturing environments, fibers from the collection bags, large soot agglomerates and other contaminants. As the present disclosure offers the liquid slurry 60, contaminants may be removed or filtered by various methods (e.g., the mesh screen, Stokes settling).

Sixth, use of the system 20 and forming method 130 may offer near net shape articles 10. Conventional processes produce large articles which are pressed, consolidated, remelted, and then cut into the photomask shapes. Use of the present disclosure offers the ability to cast near-net shape articles 10 which may need only minor trimming and polishing to form the article 10.

Seventh, use of the forming method 130 may offer higher quality glass articles 10. In conventional article formation, contaminants cannot be removed from the soot after generation and capture, and end up in the photomask blanks in the form of inclusions. Also, large pressed parts are difficult to press to a uniform density such that voids can form that result in gas seeds in the final article 10. Finally, gas diffusion in and out of a large pressed soot part may take much longer than in a small thin part such that the removal of trapped gas and/or residual organic matter within the pressed part is significantly more time-consuming than for small parts. Use of the method 100 allows contaminants to be filtered while still in the slurry 60, the density of the green parts to be uniform with little to no void formation, and for adsorbed gas to be removed during the evacuation of the slurry 60 (e.g., step 140). The resulting glass article 10 may be free of gas seeds after consolidation so that only a mild reheat (e.g., to temperatures about 1500° C.) may be necessary to obtain transparent glass.

Eighth, the forming method 130 may allow for ease of doping of the glass article 10. Conventional soot pressing processes produce large (e.g., from about 5 kg to about 10 kg) pressed soot bodies that may require OH doping by consolidating in a steam-containing atmosphere. These large parts may have relatively low thermal conductivity and long diffusion distances such that a long doping duration may be needed to achieve thermal uniformity throughout the part and to diffuse the dopant (e.g., water) uniformly. Use of the method 100 and system 20 may produce green bodies which are thin and therefore have a short diffusion distance which results in faster heating and uniform diffusion of the optional dopants.

Ninth, as the soot 40 is captured within the capture medium 48 proximate the outlet 33 of the burner 32, a lower amount of total gas needs to be passed through the burner 32 as compared to conventional designs. In conventional designs, the combustion of source chemicals to produce soot often produces insufficient volumetric flow of gas to move the soot to a requisite capture point or a pollution scrubbing system. As such, ambient air often needs to be drawn to aid in carrying the soot. Often, ambient air contains contaminants which lead to defects in products made from the soot. Use of the presently disclosed system 20 avoids the contaminant issue as little to no ambient air is necessary to transport the soot 40. For example, as the capture medium 48 is introduced to the soot stream 36 proximate the outlet 33 of the burner 32, the soot 40 does not need to be carried a great distance and as such little to no ambient air which may contain contaminants is needed.

Tenth, as the soot 40 is stored in the capture medium 48 as the slurry 60, the system 20 may offer a more compact and space efficient storage of the soot 40 as compared to conventional designs. Conventional storage of soot is often inefficient as the soot has a high surface area and low packing density. Such features lead to large volumes of relatively low weight soot storage. Use of the presently disclosed system 20 allows for the soot 40 to be stored in a more compact form as the slurry 60 thereby decreasing the overall required area for storage of the soot 40.

Aspect 1 of the description is:
A method of capturing soot, comprising:
combusting a first precursor in a burner to produce a soot stream, the soot stream comprising soot and exiting the burner at an outlet; and
directing a capture medium to the soot stream, the capture medium contacting the soot in an impact region, the soot having a temperature greater than 50° C. in the impact region.

Aspect 2 of the description is:
The method of Aspect 1, wherein the first precursor comprises a silicon-containing compound.

Aspect 3 of the description is:
The method of Aspect 2, wherein the first precursor comprises a siloxane compound.

Aspect 4 of the description is:
The method of Aspect 1, wherein the first precursor comprises a titanium-containing compound.

Aspect 5 of the description is:
The method of any of Aspects 1-4, wherein the capture medium comprises a liquid.

Aspect 6 of the description is:
The method of Aspect 5, wherein the liquid is water.

Aspect 7 of the description is:
The method of either of Aspects 5 and 6, wherein the liquid further comprises a dispersant.

Aspect 8 of the description is:
The method of any of Aspects 1-7, wherein the impact region is at a distance less than 1 m from the outlet.

Aspect 9 of the description is:
The method of any of Aspects 1-8, wherein the impact region is at a distance less than 10 cm from the outlet.

Aspect 10 of the description is:
The method of any of Aspects 1-9, wherein the combusting further comprises combusting a second precursor in the burner.

Aspect 11 of the description is:
The method of Aspect 10, wherein the first precursor comprises a silicon-containing compound and the second precursor comprises a titanium-containing compound.

Aspect 12 of the description is:
The method of any of Aspects 1-11, wherein the directing further comprises forming a slurry from the soot and the capture medium.

Aspect 13 of the description is:
The method of Aspect 12, wherein the forming of the slurry comprises condensing the capture medium.

Aspect 14 of the description is:
The method of any of Aspects 12 and 13, further comprising:
recirculating the slurry through the soot stream.

Aspect 15 of the description is:
The method of any of Aspect 1-14, wherein the temperature of the soot in the impact region is greater than 100° C.

Aspect 16 of the description is:
The method of any of Aspect 1-14, wherein the temperature of the soot in the impact region is greater than 200° C.

Aspect 17 of the description is:
A method of capturing soot, comprising:
combusting a first precursor in a burner to produce a soot stream comprising soot; and
passing a capture medium into the soot stream proximate the burner such that the soot is captured in the capture medium and forms a slurry.

Aspect 18 of the description is:
The method of Aspect 17, further comprising:
recirculating the slurry through the soot stream.

Aspect 19 of the description is:
The method of any of Aspects 17 and 18, wherein the capture medium comprises water and the capture medium is passed into the soot stream as both a vapor and an aerosol.

Aspect 20 of the description is:
The method of any of Aspects 17-19, wherein the capture medium comprises a dispersant.

Aspect 21 of the description is:
The method of any of Aspects 17-20, further comprising:
passing the soot stream and the capture medium through a constriction defined by a blockage.

Aspect 22 of the description is:
The method of any of Aspects 17-21, further comprising:
condensing the soot stream and the capture medium to a condensate; and
passing the condensate through the soot stream proximate the burner.

Aspect 23 of the description is:
The method of any of Aspects 17-22, wherein the first precursor comprises at least one of Ti, Si, Mg, Fe, P and Ca.
Aspect 24 of the description is:
The method of any of Aspects 17-23, wherein the first precursor comprises a silicon-containing compound comprising octamethylcyclotetrasiloxane and wherein a second precursor comprising a titanium-containing compound is combusted in the burner.
Aspect 25 of the description is:
A method of capturing soot, comprising:
  combusting a first precursor in a burner to produce a soot stream comprising soot;
  passing a capture medium into the soot stream proximate the burner such that the soot is captured in the capture medium and forms a slurry; and
  recirculating the slurry through the soot stream such that the slurry is from about 20 wt % to about 80 wt % of the soot.
Aspect 26 of the description is:
The method of Aspect 25, wherein the combusting the first precursor in a burner to produce a soot stream comprising soot further comprises:
  combusting the first precursor and a second precursor in the burner to produce a soot stream, wherein the first precursor comprises a silicon-containing compound and the second precursor comprises at least one of Ge, Er, Al, Nd, Bi, Sb, Ti, Yb and Rb.
Aspect 27 of the description is:
The method of any of Aspects 25-26, further comprising:
  filtering the slurry through a mesh screen.
Aspect 28 of the description is:
The method of any of Aspects 25-26, wherein the capture medium comprises water.
Aspect 29 of the description is:
The method of any of Aspects 25-28, further comprising:
  condensing the capture medium and the soot stream to a condensate.
Aspect 30 of the description is:
The method of any of Aspects 25-29, wherein the slurry is recirculated through the soot stream such that the slurry is from about 50 wt % to about 70 wt % of the soot.
Aspect 31 of the description is:
A method of capturing soot, comprising:
  combusting a first precursor comprising a silicon-containing compound and a second precursor in a burner to produce a soot stream comprising soot;
  passing water as a vapor and aerosol into the soot stream proximate the burner such that the soot is captured in the water and forms a slurry;
  recirculating the slurry through the soot stream such that the slurry is from about 20 wt % to about 80 wt % of the soot; and
  mixing a second slurry with the slurry, wherein the second slurry has a different wt % of the soot than the slurry.
Aspect 32 of the description is:
The method of Aspect 31, wherein the second precursor comprises at least one of Ge, Er, Al, Nd, Bi, Sb, Ti, Yb and Rb.
Aspect 33 of the description is:
The method of any of Aspects 31-32, further comprising:
  filtering the slurry through a mesh screen
Aspect 34 of the description is:
The method of any of Aspects 31-33, further comprising:
  cooling the slurry prior to recirculating the slurry through the soot stream.

Aspect 35 of the description is:
The method of any of Aspects 31-34, further comprising:
  condensing the soot stream and the water to a condensate; and
  passing the condensate through the soot stream proximate the burner.
Aspect 36 of the description is:
The method of any of Aspects 31-35, further comprising:
  passing the soot stream and the water through a constriction defined by a blockage.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise.

What is claimed is:

1. A method of capturing soot, comprising:
  combusting a first precursor in a burner to produce a soot stream, the soot stream comprising soot and exiting the burner at an outlet; and
  directing a capture medium to the soot stream, the capture medium contacting the soot in an impact region, the soot having a temperature greater than 50° C. in the impact region, wherein the first precursor comprises a silicon-containing compound or a titanium-containing compound.

2. The method of claim 1, wherein the first precursor comprises a siloxane compound.

3. The method of claim 1, wherein the capture medium comprises a liquid.

4. The method of claim 1, wherein the impact region is at a distance less than 1 m from the outlet.

5. The method of claim 1, wherein the temperature of the soot in the impact region is greater than 200° C.

6. A method of capturing soot, comprising:
  combusting a first precursor in a burner to produce a soot stream, the soot stream comprising soot and exiting the burner at an outlet; and
  directing a capture medium to the soot stream, the capture medium contacting the soot in an impact region, the soot having a temperature greater than 50° C. in the impact region, wherein the combusting further comprises combusting a second precursor in the burner.

7. The method of claim 6, wherein the first precursor comprises a silicon-containing compound and the second precursor comprises a titanium-containing compound.

8. A method of capturing soot, comprising:
combusting a first precursor in a burner to produce a soot stream, the soot stream comprising soot and exiting the burner at an outlet; and
directing a capture medium to the soot stream, the capture medium contacting the soot in an impact region, the soot having a temperature greater than 50° C. in the impact region, wherein the directing further comprises forming a slurry from the soot and the capture medium.

9. The method of claim 8, wherein the forming of the slurry comprises condensing the capture medium.

10. A method of capturing soot, comprising:
combusting a first precursor in a burner to produce a soot stream comprising soot; and
passing a capture medium into the soot stream proximate the burner such that the soot is captured in the capture medium and forms a slurry.

11. The method of claim 10, wherein the capture medium comprises water and the capture medium is passed into the soot stream as both a vapor and an aerosol.

12. The method of claim 10, further comprising:
condensing the soot stream and the capture medium to a condensate; and
passing the condensate through the soot stream proximate the burner.

13. The method of claim 10, wherein the first precursor comprises a silicon-containing compound comprising octamethylcyclotetrasiloxane and wherein a second precursor comprising a titanium-containing compound is combusted in the burner.

14. A method of capturing soot, comprising:
combusting a first precursor comprising a silicon-containing compound and a second precursor in a burner to produce a soot stream comprising soot;
passing water as a vapor and aerosol into the soot stream proximate the burner such that the soot is captured in the water and forms a slurry;
recirculating the slurry through the soot stream such that the slurry is from about 20 wt % to about 80 wt % of the soot; and
mixing a second slurry with the slurry, wherein the second slurry has a different wt % of the soot than the slurry.

15. The method of claim 14, wherein the second precursor comprises at least one of Ge, Er, Al, Nd, Bi, Sb, Ti, Yb and Rb.

16. The method of claim 14, further comprising:
filtering the slurry through a mesh screen.

17. The method of claim 14, further comprising:
cooling the slurry prior to recirculating the slurry through the soot stream.

18. The method of claim 14, further comprising:
condensing the soot stream and the water to a condensate; and
passing the condensate through the soot stream proximate the burner.

19. The method of claim 14, further comprising:
passing the soot stream and the water through a constriction defined by a blockage.

* * * * *